March 13, 1973 G. M. GALDO ET AL 3,720,518
PROCESS FOR THE MANUFACTURE OF A CONCENTRATED COFFEE PRODUCT
Filed Feb. 23, 1971 2 Sheets-Sheet 1

INVENTORS.
Gustavo M. Galdo
Irwin L. Adler
BY
ATTORNEY

United States Patent Office 3,720,518
Patented Mar. 13, 1973

3,720,518
PROCESS FOR THE MANUFACTURE OF A CONCENTRATED COFFEE PRODUCT
Gustavo M. Galdo, River Edge, and Irwin L. Adler, River Vale, N.J., assignors to General Foods Corporation, White Plains, N.Y.
Filed Feb. 23, 1971, Ser. No. 117,991
Int. Cl. A23f *1/08*
U.S. Cl. 99—71                                25 Claims

ABSTRACT OF THE DISCLOSURE

A process whereby a high concentration coffee extract containing about 30 to 40% solids by weight of the extract can be produced in an ordinary percolator set without incurring any significant loss of extraction yield. The key step in the process of this invention is the use of intercolumn concentration prior to the fresh stage in a percolator set. The concentrated extract is advantageously used in further processing to produce a soluble coffee product.

BACKGROUND OF THE INVENTION

Figure 1:
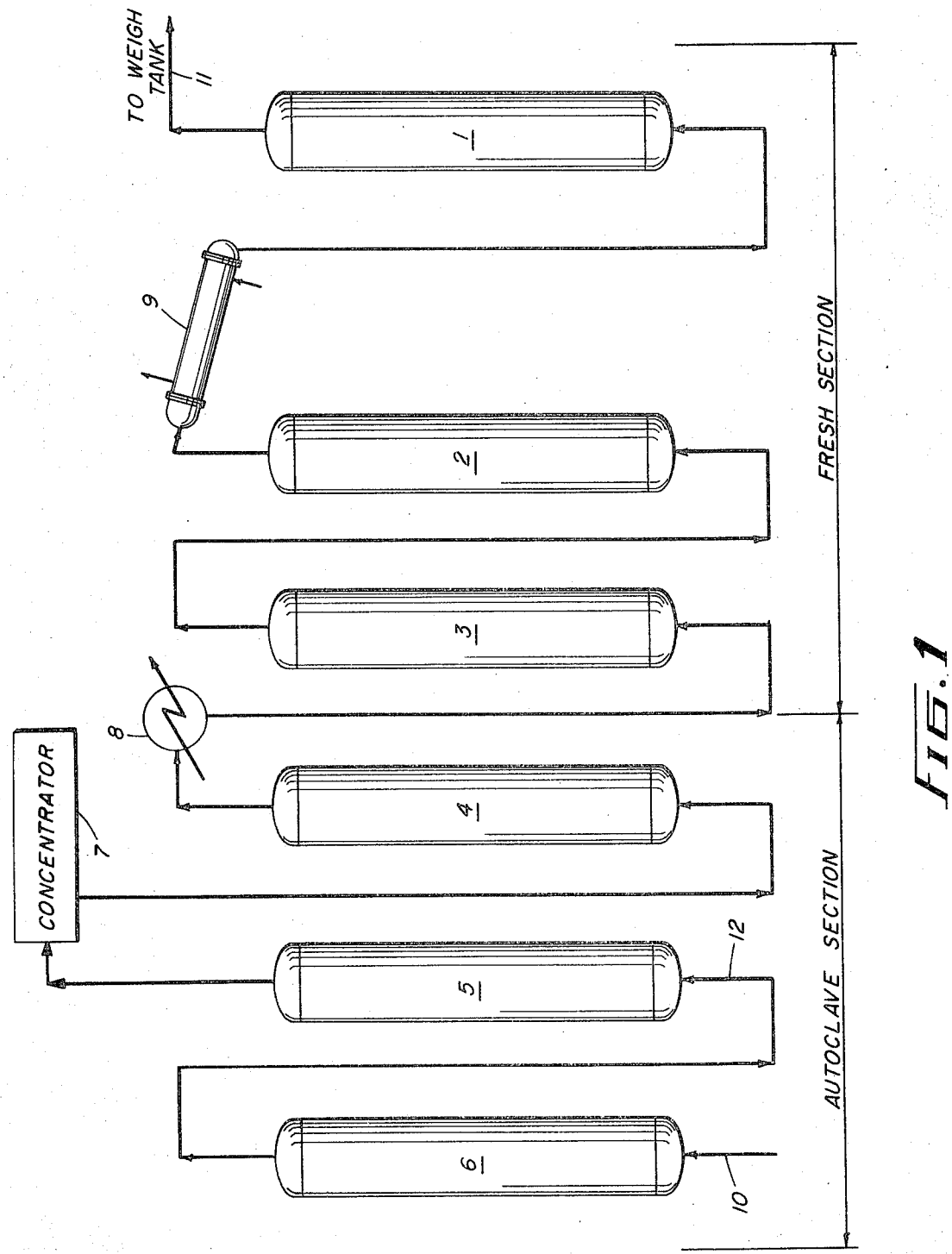

This invention relates to a method of producing coffee extract which is particularly suitable for further processing such as spray drying or freeze drying to obtain a dry instant coffee product. More specifically, it relates to an improved process for obtaining a high concentration of coffee solids in the extract.

The standard technique for producing coffee extract in a commercial coffee plant is to use a percolator set which is comprised of from 4 to 8 extraction columns wherein roasted and ground coffee is extracted by a countercurrent flow of extract and coffee through the percolator set. Typically, an aqueous liquor is pumped into the bottom of an extraction column containing the most extracted (or spent) coffee and the liquor then flows successively through the columns and is drawn off from the column containing the least extracted (fresh) roasted and ground coffee. The liquor drawn off is referred to as extract, or coffee extract, and has an average concentration of about 20–30% coffee solids by weight of the extract. In practice, as soon as the aqueous liquor contacts coffee in the spent column, coffee solids start building up in the liquor and the liquor flowing through the columns is also referred to as extract. The concentration of the extract increases as it flows through the percolator set, and the final concentration in the extract draw-off is the maximum extract concentration. After each draw-off the coffee in the most spent column is emptied. The column is recharged with freshly roasted and ground coffee and this column which was the spent column then becomes the fresh column for draw-off on the next cycle. The flow of extract from the bottom to the top of an extraction column is referred to as upflow. Extract may also flow from the top to the bottom of an extraction column, i.e., downflow.

In order to manufacture an instant coffee having certain desirable flavor and physical characteristics, it has been found advantageous to spray dry a coffee extract having concentrations significantly higher than those achieved in standard percolation operations. Also, it has been found economically advantageous in a process for manufacturing freeze dried instant coffee to utilize higher concentration coffee extracts for freezing and freeze drying. It is a common practice in processes where higher concentration extracts than those obtained in standard percolation operations are needed, to concentrate the final extract (draw-off from the fresh stage) by vacuum evaporation or freeze concentration. These concentration techniques have major disadvantages. Vacuum evaporation tends to strip off desired aromatic constituents which must then be added back to the concentrated extract in an attempt to achieve a quality, high concentration extract. Freeze concentration, while producing a more flavorful concentrated extract, is significantly more expensive than evaporative concentration techniques. Also, all of the extraction techniques used to concentrate the extract obtained in a standard percolation operation add to the cost and complexity of manufacturing a quality instant coffee.

In U.S. Pats. 2,915,403 in the name of Clinton et al., and 2,915,399 in the name of Guggenheim et al., processes are described for controlling the heat profile across a percolator set via the use of intercolumn heaters. These techniques are used to obtain higher concentration extracts from the percolators. Two disadvantages have been associated with such techniques. A yield loss is generally associated with the higher concentration extracts achieved, and operating difficulties due to pressure drop within the percolator set results in an intolerable number of shutdowns and clean-ups, making the process economically undesirable.

SUMMARY OF THE INVENTION

It has now been discovered that by using intercolumn concentration, i.e., concentrating the extract between two extraction columns in a percolator set, a high concentration coffee extract (solids content of 30 to 40%) can be produced without incurring any significant loss of extraction yield. It has also been found that the process of this invention produces a high quality coffee extract and does not result in any unwarranted shutdowns in the operation of a percolation set.

The process of this invention is suitable for use with any blend of roasted and ground coffee and the coffee may be either decaffeinated or undecaffeinated.

The process of this invention may be best described as utilizing a standard percolation set with an intercolumn concentrator between two of the extraction columns. In the spent end of the percolation set, the coffee grounds are contacted with a hot aqueous extraction medium, typically hot water, as in any standard percolation operation. After the extract has passed through at least one extraction column and prior to introducing the extract into the next adjacent extraction column, it is passed through a concentrator wherein the solids content of the extract is increased about 3 to 10% solids by weight of the extract. That is, extract from an extraction column is fed into a concentrator, and there are two streams exiting from the concentrator, a more concentrated extract stream and a water or water vapor stream.

Intercolumn concentration can be accomplished by many known techniques. Thus, a membrane filter which will selectively remove water from the extract can be used as the intercolumn concentrator. Similarly, a flash evaporator or a vacuum evaporator can be used as the intercolumn concentrator. Other means of intercolumn concentration may readily occur to those skilled in the art, and the term intercolumn concentration is intended to include all unit operations suitable for increasing the concentration of an extract stream between two columns in a percolator set.

A preferred means of achieving intercolumn concentration is via evaporation. The extract stream exiting from one column in the percolator set may be readily passed through an evaporator prior to entering the next adjacent column in the percolator set. Prior to the intercolumn evaporator, the extract may be passed through a cooler and the cooled extract may be subjected to a separation device such as a filter or centrifuge in order to remove waxy and tar-like insoluble solids from the extract. The extract will then preferably be passed through a vacuum evaporator and the concentrated extract will be heated prior to feeding it into the next extraction column in the percolator set.

In conjunction with the use of intercolumn concentration, the temperature profile of the extract could be increased. Thus, the extract may advantageously be passed through an intercolumn heater in order to raise the temperature of the extract from 5° to 30° F. as a means of further increasing the concentration of the final extract. There should be at least one extraction column between the intercolumn heater and the intercolumn evaporator.

As in any standard percolator operation, the extract will flow through a cooler prior to being introduced into the extract column containing the freshly roasted and ground coffee (fresh column). The cooler is used to adjust the temperature of the extract and coffee in the fresh stage so that the temperature of the final extract drawn off from the fresh stage is maintained at a maximum of about 210° F. and typically between 170° to 210° F. As previously indicated, the flow of extract in a standard percolation operation may be either from the bottom to the top of an extraction column (upflow) in all of the extraction columns, or vice versa (down flow). It may be advantageous when using an intercolumn heater, to reverse the direction of flow through the columns after the extract passes through the heater and to use downflow through the remaining columns in the percolator set, or upflow if the prior columns have been exposed to downflow.

The key step in the process of this invention is the use of an intercolumn concentrator prior to passing the extract into the fresh stage of the percolator set as a means of increasing the concentration of the final extract without harming product quality, and the use of this partially concentrated extract as the extraction medium in the remainder of the percolator set. It may be preferred to use the intercolumn evaporator two or three columns prior to the fresh stage in order to minimize the probability of causing quality degradation of the more desirable fractions of coffee solids.

It may be desirable to use more than one intercolumn concentrator in the percolation set. Thus, one might use a flash evaporator in the auoclave section of the percolator set, and a vacuum evaporator in the fresh section of the percolator set.

Also, if the intercolumn concentrator is located in the fresh section of the percolator set, it may be advantageous to strip aromas from the extract prior to concentrating the extract. These aromas could then be added back to the extract after it passes through the intercolumn concentrator, or to the final extract drawn off from the fresh stage, or even to a dry soluble coffee prepared from the final extract. The aroma stripping can be achieved in a column wherein steam is passed countercurrent to the flow of extract, the steam volatilizing and sweeping out the desired aroma constituents. Alternatively, vacuum stripping or any other means wherein a minimum of water is removed with the aromatic constituents can be used.

The final extract drawn off from the fresh stage will be subject to cooling, clarification and sludge removal depending upon the process used for further treating coffee extract.

DESCRIPTION OF THE PREFERRED EMBODIMENT

FIG. 1 shows a set of percolators consisting of 6 extraction columns, 1-6. While the number of extraction columns in a percolator set may vary, typically from 4-8 columns, the experimental run hereinafter described refers to the operation of a 6-extraction column percolator set.

As depicted in FIG. 1, column 6 contains the most spent (most extracted) roasted and ground coffee and the degree of extraction of the coffee in the other columns decreases as the number of the column decreases until column 1, which contains freshly roasted and ground coffee. In the standard percolation operation the extraction liquor, typically hot water, would be pumped into the bottom of column 6 at 10, pass on through column 6, flow out the top of column 6 as a dilute extract, and successively flow into the bottom of each next adjacent column and out the top until extract reached the bottom of column 1. The concentration of the extract would increase as it passed through each successive column. In the standard percolation operation prior to entering column 1, the extract would pass through cooler 9 and then be pumped into column 1 through the bottom of the column. When column 1 was filled with extract the final extract would be drawn off column 1 into a weight tank and a predetermined weight of extract would be drawn off. While the extract is being drawn off from column 1 the feed water would be diverted to the bottom of column 5 and column 6 would be isolated. The fully extracted grounds are blown out of the column, and the column refilled with freshly roasted and ground coffee. When the draw-off from column 1 was completed the extract flow from the top of column 1 would then be diverted to the bottom of column 6 which would then become a new fresh stage. The extractor columns are connected by a pipe arrangement commonly referred to as manifolding such that any of the columns in sequence can be a spent stage or a fresh stage.

The concentration of the extract and the yield obtained from the coffee (yield being measured as the percentage of solids in the extract based on the dry solids in the freshly loaded extractor column) will be dependent upon many variables such as the blend of coffee used, the total time of extraction, the feed water temperature and the draw off factor (DOF), e.g., the amount of extract finally drawn off from the fresh stage divided by the weight of roasted and ground coffee in the fresh stage.

As the extract liquor flows through the percolator set, the solids content of the extract increases in each successive extraction column. In columns 4, 5 and 6, the bulk of the solids extracted are autoclave solids and the last 3 columns of a 6 column percolator set are referred to in FIG. 1 as the autoclave section. The intercolumn concentrator 7 is shown in the extract line between columns 5 and 4. According to the process of this invention, the intercolumn evaporator may also be placed between columns 6 and 5, columns 4 and 3, 3 and 2, or 2 and 1. In any event, the concentrator will be used to increase the solids content of the extract about 3 to 10%. Depending upon the location of the concentrator, the extract being fed into the evaporator may have a solids content anywhere between 3 and 20% prior to evaporation (and from 6 to 30% after concentration).

Since the autoclave solids are the least flavorful solids in the final coffee extract, it has been found preferable to place the concentrator in the autoclave section of the percolator set. However, in order to avoid degrading the flavor that may be associated with these autoclave solids, when the concentrator is an evaporator it is preferred to use a vacuum evaporator. Vacuum evaporation is especially preferred if the evaporator is between columns 3 and 2, or 2 and 1.

It has also been found that if the extract is permitted to cool, wax-like or tar-like material tends to precipitate out and foul the evaporator surface. Therefore, it is a preferred embodiment of this invention to cool the extract prior to evaporation and remove these waxes via filtration or centrifugation. The extract prior to vacuum evaporation should be cooled to below 200° F. and preferably to from 100 to 150° F.

Figure 2:
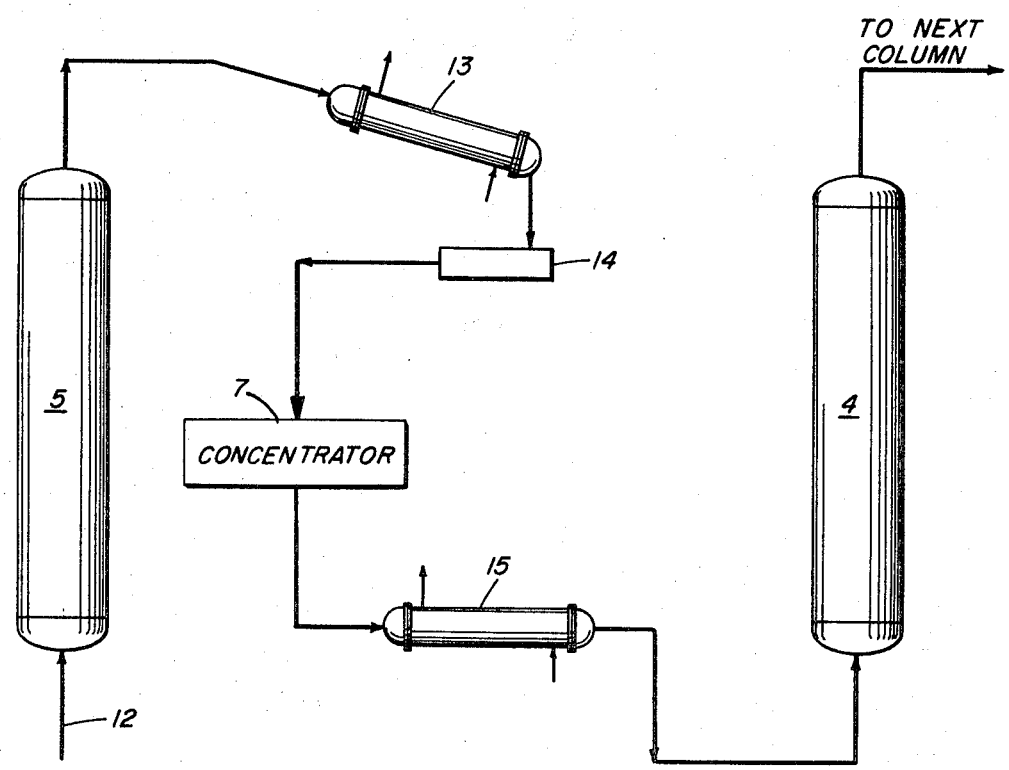

A critical control in the operation of a percolator set in order to achieve a desired extraction yield, is the extract temperature profile across the percolator set. In a normal percolator operation, the extract medium will be fed to the bottom of column 6 at a temperature of about 330° to 370° F., and there will be a temperature drop from column to column of about 10° to 20° F. The extract after coming off the intercolumn evaporator may be significantly cooler than the extract temperature prior to intercolumn evaporation. Therefore, it is preferred to pass the extract from the intercolumn evaporator through a heater in order to raise the extract temperature to its initial temperature. Conversely, if the extract temperature has been increased significantly during evaporation, it may be desirable to cool the extract to its initial temperature prior to evaporation. In FIG. 2, the extract coming off the top of column 5 is shown passing through a cooler 13, a separating device 14, and intercolumn concentrator (e.g., a vacuum evaporator) 7, and a heater 15 prior to being fed to the bottom of column 4.

The manifold piping of the percolator set is such that the extract can be drawn off from any column in the percolator set and fed through the intercolumn concentrator prior to being fed into the next adjacent extraction column. In this manner, only one intercolumn concentrator is required for a percolator set.

It has been found that raising the temperature profile of the extract may be advantageous in obtaining a high concentration, final extract. Therefore, it may be desirable to pass the extract through an intercolumn heater shown as 8 in FIG. 1. There should however, be at least one extraction column between the intercolumn evaporator and the intercolumn heater. The temperature of the extract will normally be increased from 5° to 20° F. in passing through the intercolumn heater. It may also be desirable to reverse the flow of extract through the columns after the intercolumn heater. Also, it is preferred to use the intercolumn heater in the autoclave section of the percolator set and in some instances the intercolumn heater will be further toward the spent end of the percolator set than the intercolumn concentrator.

The process of this invention has been found capable of increasing the extract concentration obtained in any ordinary percolator set from about 20 to 30% to about 30 to 40% solids by weight of this extract (without an intercolumn heater). As the concentration of the final extract is increased, there is a tendency for the yield to decrease slightly. The combination of an intercolumn concentrator and an intercolumn heater may overcome this yield loss.

It may be desirable to use more than one intercolumn concentrator in a percolator set. Thus, while 8 in FIG. 1 has been described as an intercolumn heater, it could also be a second intercolumn evaporator. There should be at least one extraction column between the two intercolumn concentrators for otherwise they would merely function as a two stage concentrator.

When utilizing two concentrators, it may be desirable to utilize a concentrator nearer the fresh stage which will avoid degrading the product, such as a vacuum concentrator, while the concentrator nearer the spent column could operate at higher temperatures or pressures, such as a flash evaporator.

A concentrated coffee product consisting of frozen coffee extract may be produced by the process of this invention, or the concentrated extract may be subjected to spray drying or freeze drying as a means of producing a dry concentrated soluble coffee product. Typically, the moisture content of the dry product would be about 1 to 5% and more preferably, about 2.5 to 4%. In a preferred embodiment of this invention, extract at a concentration of from 30 to 40% solids will be frozen to below −10° F. (preferably below −40° F.) and vacuum freeze dried to a stable moisture content. The frozen extract may be granulated to a desired particle size prior to freeze drying.

It may also be preferred to form a mixture of ice crystals and extract (a slush) prior to finally freezing the extract and to extrude the slush in a desired shape. Also, the slush can be foamed using a gas such as nitrogen or carbon dioxide prior to freezing as a means of adjusting product density.

The process of this invention will be further described by the following example:

A blend of roasted and ground coffee was extracted in a percolator set consisting of six extraction columns having a 10″ diameter. In a control run, hot water at a temperature of 350° F. was fed into the bottom of the spent stage and passed successively through the percolator columns and a final extract was drawn off the top of column 1 (the fresh stage) into a weigh tank, until about 1.8 lbs. of extract per lb. of roasted and ground coffee in an extract column was obtained. The temperature of the extraction medium into successive columns was as follows: column 6—350° F., column 5—346° F., column 4—344° F., column 3—300° F., column 2—227° F., and after going through the cooler, the temperature into column 1 was 193° F. The final concentration of the extract was 26.4% solids by weight of the extract and represented a yield of 47.5% by weight of the dry roasted and ground coffee processed.

A second run was made using an intercolumn evaporator (an APV evaporator) between columns 4 and 3 in the percolator set. The extract was drawn off column 4 at a concentration of 11.1% solids and a temperature of 260° F. The extract was cooled to 125° F. and passed through a Westfalia desludging centrifuge and was then passed through the APV evaporator where the concentration was increased to 15.9% solids by weight of the extract (the evaporation being under vacuum at a temperature of 125° F.) and the extract was then heated to 260° F. prior to introducing it into column 3. The temperature of the extract going into the successive columns was as follows: column 6—349° F., column 5—346° F., column 4—344° F., column 3—260° F., column 2—221° F., and after passing through the cooler, the temperature into column 1 was 195° F. Extract was drawn off column 1 until 1.3 lbs. of extract was drawn off for every lb. of roasted and ground coffee in a given column. The concentration of the final extract was 34.2% solids and the final yield was 46.4% solids on a dry roasted basis. The slight decrease in yield in the second run was attributed primarily to the lower temperatures in column 3 and 2. The quality of the extract obtained in run number 2 was judged equal to the quality of the extract obtained in the control run.

The foregoing example was for illustrative purposes only and the scope of this invention is intended to be limited only by the appended claims.

What is claimed is:

1. A process for producing a concentrated coffee product comprising extracting roasted and ground coffee in a percolator set wherein:
    (a) a hot aqueous medium is fed into the last stage of the percolator set,
    (b) the aqueous medium flowing through successive columns in the percolator set, thereby extracting solids from the roasted and ground coffee, said aqueous medium containing soluble solids being coffee extract,
    (c) drawing-off the coffee extract from a column prior to the fresh stage of the percolator set and passing said extract through a concentrator wherein the coffee solids content of the extract is increased by about 3 to 10 percent solids by weight of the extract by removing water from the extract in said concentrator,
    (d) feeding the concentrated coffee extract from the concentrator into the column adjacent to the column from which it was drawn off and continuing the flow of extract through the remainder of the percolator set, and
    (e) drawing off a final coffee extract from the fresh stage of the percolator set at a concentration of from 30 to 40% coffee solids by weight of the extract at a temperature of less than 210° F.

2. The process of claim 1 wherein the aqueous medium is water at a temperature of from 330° F. to 370° F.; the coffee extract in step (c) being cooled as it is drawn off to a temperature of 100° to 210° F.; the cooled coffee extract being concentrated in an evaporator and the concentrated coffee extract being heated after evaporative concentration.

3. The process of claim 2 wherein the coffee extract is subjected to vacuum evaporation at a temperature of below 150° F.

4. The process of claim 2 wherein the cooled coffee extract is filtered to remove wax-like solids prior to evaporation.

5. The process of claim 2 wherein the cooled coffee extract is centrifuged to remove wax-like solids prior to evaporation.

6. The process of claim 3 wherein the cooled coffee extract is filtered to remove wax-like solids prior to evaporation.

7. The process of claim 3 wherein the cooled coffee extract is centrifuged to remove wax-like solids prior to evaporation.

8. The process of claim 2 wherein the coffee extract in step (d) is passed through an intercolumn heater between two adjacent columns in the autoclave sections of the percolator set to obtain a temperature increase of from 5° to 30° F.

9. The process of claim 3 wherein the coffee extract in step (d) is passed through an intercolumn heater between two adjacent columns in the autoclave section of the percolator set to obtain a temperature increase of from 5° to 30° F.

10. The process of claim 5 wherein the coffee extract in step (d) is passed through an intercolumn heater between two adjacent columns in the autoclave section of the percolator set to obtain a temperature increase of from 5° to 30° F.

11. The process of claim 7 wherein the coffee extract in step (d) is passed through an intercolumn heater between two adjacent columns in the autoclave section of the percolator set to obtain a temperature increase of from 5° to 30° F.

12. The process of claim 2 wherein the final coffee extract is spray dried to a moisture content of from 1 to 5%.

13. The process of claim 3 wherein the final coffee extract is spray dried to a moisture content of from 1 to 5%.

14. The process of claim 5 wherein the final coffee extract is spray dried to a moisture content of from 1 to 5%.

15. The process of claim 7 wherein the final coffee extract is spray dried to a mositure content of from 1 to 5%.

16. The process of claim 2 wherein the final coffee extract is frozen and freeze dried to a moisture content of from 1 to 5%.

17. The process of claim 16 wherein the frozen extract is reduced to a granular form prior to freeze drying.

18. The process of claim 3 wherein the final coffee extract is frozen and freeze dried to a moisture content of from 1 to 5%.

19. The process of claim 18 wherein the frozen extract is reduced to a granular form prior to freeze drying.

20. The process of claim 5 wherein the final coffee extract is frozen and freeze dried to a moisture content of from 1 to 5%.

21. The process of claim 20 wherein the frozen extract is reduced to a granular form prior to freeze drying.

22. The process of claim 1 wherein the extract is passed through a second intercolumn concentrator, there being at least one extraction column between the intercolumn concentrators.

23. The process of claim 1 wherein aromatic constituents are stripped from the extract prior to passing the extract into the intercolumn concentrator.

24. The process of claim 23 wherein the stripped aromatic constituents are added back to the extract as the extract exits from the intercolumn concentrator.

25. The process of claim 23 wherein the stripped aromatic constituents are added back to the final extract drawn-off from the percolator set at a point prior to drying the concentrated extract.

References Cited

UNITED STATES PATENTS

| | | | |
|---|---|---|---|
| 3,655,398 | 4/1972 | Pitchon et al. | 99—71 |
| 2,915,403 | 12/1959 | Clinton et al. | 99—71 |
| 2,915,399 | 12/1959 | Guggenheim et al. | 99—71 |
| 3,381,302 | 4/1968 | Reimus et al. | 99—71 |
| 3,438,784 | 4/1969 | Clinton et al. | 99—71 |

FRANK W. LUTTER, Primary Examiner

W. L. MENTLIK, Assistant Examiner

U.S. Cl. X.R.

23—270, 272.5